United States Patent [19]

Nakagawa et al.

[11] Patent Number: 5,980,819
[45] Date of Patent: Nov. 9, 1999

[54] SINTERED OIL-IMPREGNATED BEARING, MANUFACTURING METHOD THEREOF, AND MOTOR COMPRISING SAME

[75] Inventors: Hisaya Nakagawa; Toru Nakanishi; Michiaki Takizawa; Takehiko Yazawa, all of Nagano, Japan

[73] Assignee: Kabushiki Kaisha Sankyo Seiki Seisakusho, Nagano, Japan

[21] Appl. No.: 09/038,963

[22] Filed: Mar. 12, 1998

[30] Foreign Application Priority Data

Mar. 13, 1997 [JP] Japan .................................. 9-058836

[51] Int. Cl.$^6$ ................................ B22F 3/12; B22F 3/24
[52] U.S. Cl. ................................. 419/27; 419/35; 419/38
[58] Field of Search .................................. 419/27, 35, 38; 75/231, 246

[56] References Cited

U.S. PATENT DOCUMENTS

| | | |
|---|---|---|
| 2,042,635 | 6/1936 | Schellens . |
| 2,273,832 | 2/1942 | Carney et al. . |
| 3,343,953 | 9/1967 | Schladitz . |
| 4,221,828 | 9/1980 | Sato et al. ................................ 427/217 |
| 5,358,753 | 10/1994 | Rao et al. ................................ 427/451 |
| 5,484,662 | 1/1996 | Rao ........................................ 428/553 |

FOREIGN PATENT DOCUMENTS 2216545  10/1989  United Kingdom .

*Primary Examiner*—Ngoclan Mai
*Attorney, Agent, or Firm*—Sughrue, Mion, Zinn, Macpeak & Seas, PLLC

[57] ABSTRACT

A sintered oil-impregnated bearing 20 used in a bearing device 30 is made by molding a mixture of a composite fine particles (main material) and a solid lubricant previously added to the main material in a proportion of about one weight percent to about three weight percent, wherein the main material comprises composite fine particles composed of iron powders having surfaces coated with copper, and the solid lubricant comprises fine particles made of an inorganic compound such as molybdenum disulfide and having surfaces coated with copper, sintering the mold at a temperature in a range of 650° C. to 700° C. to form a sintered body 20*b*, and impregnating the sintered body 20*b* with lubricant oil. Since the sintered body 20*b* itself has lubricity, the sintered oil-impregnated bearing is free from abrasion or seizure even if oil is used up.

4 Claims, 4 Drawing Sheets

SINTERED OIL-IMPREGNATED BEARING, MANUFACTURING METHOD THEREOF, AND MOTOR COMPRISING SAME

BACKGROUND OF THE INVENTION

1. Field of the Invention

The present invention relates to a sintered oil-impregnated bearing for rotatably supporting a motor shaft or the like, and a motor using same. More particularly, the present invention relates to the material technology for improving the lubricant performance of a sintered oil-impregnated bearing.

2. Related Art

As a bearing device for rotatably supporting a shaft of a motor or the like, there is known a structure having two sintered oil-impregnated bearings each having a shaft hole at the center, disposed one on the other in the axial direction in a bearing holder.

This sintered oil-impregnated bearing is manufactured by first molding composite fine particles comprising iron powders having surfaces coated with copper into a cylinder shape, sintering this cylindrical mold at a temperature near 800° C., and impregnating lubricant oil into the sintered body formed by the sintering.

In the sintered oil-impregnated bearing as mentioned above, even if the sintered body is impregnated with lubricant oil, a boundary lubrication condition may occur, wherein a motor shaft and the sintered body are in direct contact with each other between the motor shaft and the sintered oil-impregnated bearing, if a large eccentric load is applied in a lubricant oil lacking state when used in a motor operable in a wide rotational speed range of, for example, 200 rotations per second to 6000 rotations per second, such as a spindle motor for driving a CD-ROM, and if a motor having a large side thrust load such as a capstan motor for VTR rotates at a low speed in a high temperature range or at a high speed in a low temperature range to cause a large load thereto. Of course, if lubricant oil is completely exhausted in a sintered oil-impregnated bearing, this causes the above-mentioned boundary lubrication condition. However, a conventional sintered oil-impregnated bearing has a problem in that the above-mentioned boundary lubrication condition leads to abrasion and/or seizure in a relatively short time in the sintered oil-impregnated bearing, since a material itself composing the sintered body does not provide any lubricating action.

SUMMARY OF THE INVENTION

It is therefore an object of the present invention to provide a sintered oil-impregnated bearing which is free from abrasion and/or seizure even in the boundary lubrication condition where a shaft and a sintered body are in direct contact with each other, and a motor using same.

As described above, the sintered oil-impregnated bearing according to the present invention is provided in that a solid lubricant comprising fine particles made of molybdenum disulfide or the like having surfaces coated with copper is added to composite fine particles (main material) made of iron powders having surfaces coated with copper in the entirety of the cylindrical sintered body or in a bearing surface thereof, so that the sintered body itself has the lubricity. Therefore, abrasion and/or seizure will never occur even in the boundary lubrication condition where a shaft and the sintered body are in direct contact with each other. Also, since the solid lubricant used in the present invention has an improved sintering property by coating the fine particles made of an inorganic compound with copper, the sintering temperature may be reduced to 700° C. or lower. However, in favor of ensuring to provide an appropriately sintered body, the sintering temperature is set at 650° C. or higher. When the sintering temperature is set within such a range, the solid lubricant will not be decomposed during the sintering, so that the lubricant performance of the sintered body itself can be utilized, even with a sintered oil-impregnated bearing, thereby making it possible to prevent abrasion and/or seizure due to the boundary lubrication. Further, since a lower sintering temperature can be set, the dimensional accuracy for the sintered body is advantageously high.

DETAILED DESCRIPTION OF THE PREFERRED EMBODIMENTS

Structure of Sintered Oil-impregnated Bearing

A sintered oil-impregnated bearing according to the present invention will hereinafter be described with reference to FIGS. 1(a) and 1(b).

Figure 1A:
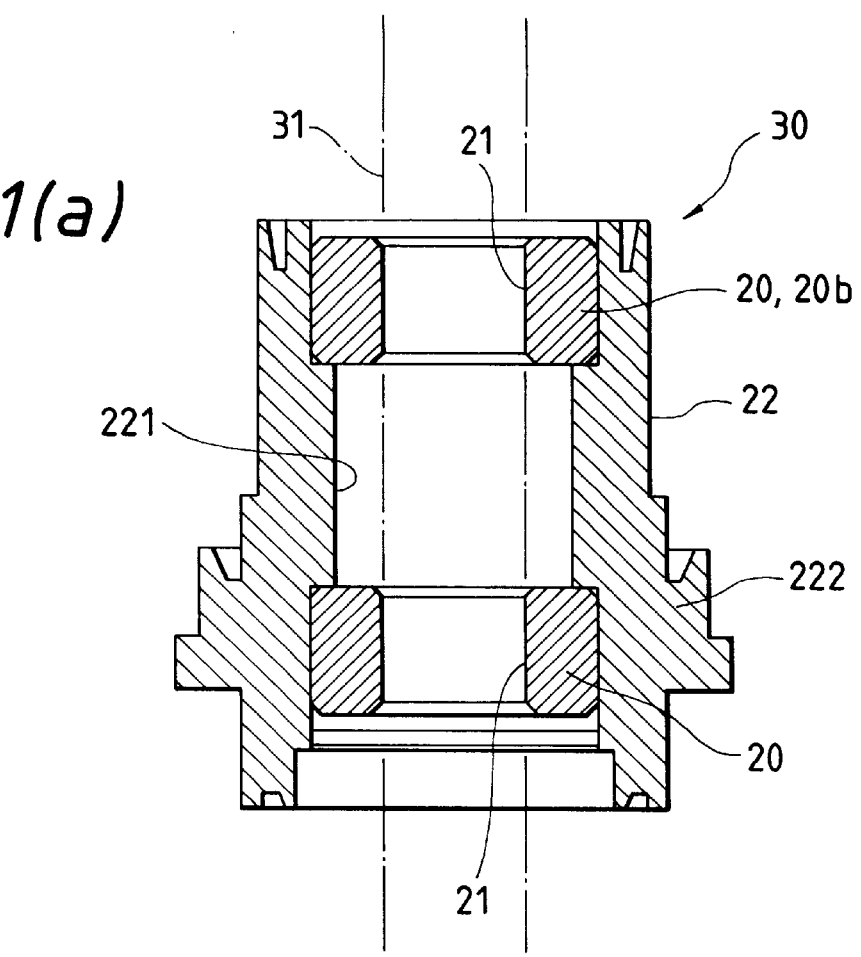
FIG. 1(a) is a vertical cross-sectional view of a bearing device, used in a spindle motor for driving CD-ROM, to which the present invention is applied.
Figure 1B:
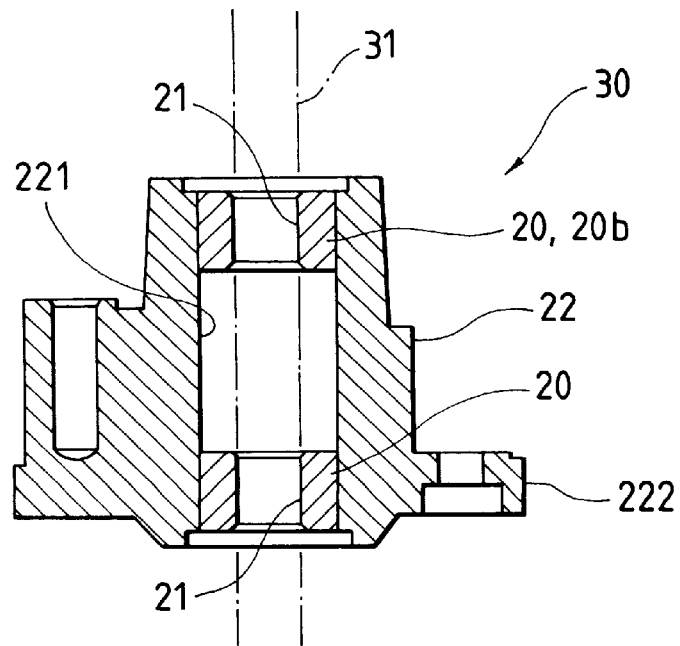
FIG. 1(b) is a vertical cross-sectional view of a bearing device, used in a capstan motor for VTR, to which the present invention is applied.

FIG. 1(a) is a vertical cross-sectional view of a bearing device for use in a spindle motor for driving CD-ROM, to which the present invention is applied, and FIG. 1(b) is a vertical cross-sectional view of a bearing device for use in a capstan motor for VTR, to which the present invention is applied. Since the bearing device for a spindle motor for driving CD-ROM and the bearing device for a capstan motor for VTR basically have the same structure, corresponding portions are designated by the same reference numerals.

As illustrated in FIGS. 1(a) and 1(b), a sintered oil-impregnated bearing 20 according to the present invention comprises a cylindrical body having a shaft hole 21 formed therethrough in a central portion for supporting a shaft 31 such as a motor shaft. Two cylindrical bodies are disposed side by side in the axial direction within a bearing holder 22 to constitute a bearing device 30. The bearing holder 22 comprises a circular bearing holding hole 221 for accommodating two sintered oil-impregnated bearings 20, and a flange portion 222 extending outwardly at a position near the lower end of the bearing holder 22.

Specifically, the sintered oil-impregnated bearing 20 is principally formed of composite fine particles comprising iron powders having surfaces coated with copper, which are molded into a cylindrical body and sintered to produce a sintered body 20b which is then impregnated with lubricant oil. Particularly, in this embodiment, the sintered oil-impregnated bearing 20 is manufactured in the following manner. First, a solid lubricant composed of fine particles made of an inorganic compound, selected from molybdenum disulfide, boron nitride, tungsten disulfide or graphite, having surfaces coated with copper, is added to a main material in a proportion ranging from about one weight percent to about three weight percent to produce a mixture. The mixture is molded with pressure in a cavity of a predetermined shape, and sintered at a temperature in a range of 650 to 700° C. Then, the sintered body is impregnated with lubricant oil to complete the sintered oil-impregnated bearing 20. Preferably, the surfaces of inorganic compound fine particles are coated with copper by soldering.

Since fine particles made of an inorganic compound such as molybdenum disulfide has a relatively low hardness, the sintered body 20b made of a material dosed with such fine particles exhibits itself the lubricity. For this reason, assuming that a large eccentric load is applied to the sintered body 20b in a lubricant oil lacking state when the sintered body 20b is used in a motor operable in a wide rotation range of, for example, 200 rotations per second to 600 rotations per second such as a spindle motor for driving CD-ROM, even if a boundary lubrication condition occurs where a motor shaft is in direct contact with the sintered body, this will not give rise to the generation of heat or deteriorated lubricant oil. Similarly, in a motor having a large side thrust load such as a capstan motor for VTR, even if the motor is rotated at a low speed in a high temperature range or at a high speed in a low temperature range to cause a large load to be applied to the sintered body 20b, a resulting boundary lubrication condition will not give rise to the generation of heat or deteriorated lubricant oil.

Appended Table 1 shows the results of an examination made on the performance of capstan motors having different characteristics with respect to sintered oil-impregnated bearings. In this examination, five different groups of capstan motors employing sintered oil-impregnated bearings manufactured with sintering temperatures set in a range of 650 to 675° C.; 680 to 700° C.; 725 to 750° C.; and 780 to 800° C. (conditions 1–4), and employing a sintered oil-impregnated bearing without additional solid lubricant (condition 5) were operated for 500 hours at 2000 rotations per minute at a temperature of −10° C. or lower. Then, the number of samples exhibiting an increase of 10 percent or more in consumed current during the operation hours and the number of samples exhibiting seizure after the operation hours were counted. The results of the examination show that seizure occurred in approximately 20 percent of the total number of the capstan motors, and an increase in consumed current was observed in approximately 50 percent, when using sintered oil-impregnated bearings 20 without an additional solid lubricant as before. However, sintered oil-impregnated bearings made of a material with an additional solid lubricant, in accordance with this embodiment, did not present any seizure, irrespective of the sintering temperature.

With sintered oil-impregnated bearings containing additional solid lubricant in accordance with this embodiment, which had been sintered at a sintering temperature set in a range of 680° C. to 700° C., an increase in consumed current was observed in 10 percent of the total number of samples, which is significantly less as compared with the conventional sintered oil-impregnated bearings used in the examination. Particularly, when the sintering temperature was set in a range of 650° C. to 675° C., merely three percent of resulting sintered oil-impregnated bearings exhibited an increase in consumed current, thus demonstrating extremely favorable results.

On the other hand, with sintered oil-impregnated bearings containing the additional solid lubricant, which had been sintered at a sintering temperature set in a range of 725° C. to 750° C., while seizure did not occur in any of the sintered oil-impregnated bearings, an increase in consumed current was observed in 20 percent of them, thereby revealing that an excessively high sintering temperature causes degraded motor performance. In addition, an increase in consumed current was observed in 33% of the total number of sintered oil-impregnated bearings with the sintering temperature set near 800° C.

In an analysis on the amount of abrasion in seized sintered oil-impregnated bearings, approximately 20 μm of abrasion was found. Also, in an analysis on the amount of abrasion in sintered oil-impregnated bearings which exhibited an increase in consumed current, approximately 5 μm of abrasion was found. It can be confirmed from these results that this embodiment effectively prevents seizure and an increase in consumed current as well as suppresses abrasion.

As described above, in the sintered oil-impregnated bearing embodying the present invention, the sintered body 20b is manufactured from a mixture consisting of a main material and a fine particles (solid lubricant) made of an inorganic compound, selected from molybdenum disulfide, boron nitride, tungsten disulfide or graphite, and its sintering property is improved by coating the surfaces of the solid lubricant particles with copper, so that the sintering temperature can be correspondingly set at a lower temperature. Thus, the resulting sintered oil-impregnated bearing 20 is advantageously free from abrasion and seizure. More specifically, even if a solid lubricant were used, mere mixture of a solid lubricant made of an inorganic compound would result in decomposition of the solid lubricant due to heat during the sintering. With the solid lubricant used in the present invention, on the other hand, since fine particles made of an inorganic compound such as molybdenum disulfide are coated with copper to improve the sintering property thereof, the sintering temperature can be correspondingly lowered to a relatively low temperature of 700° C., so that the solid lubricant will not be decomposed during the sintering. However, from the viewpoint of an improvement in the sintering property, the sintering temperature should be set at 650° C. or more. This is because fine particles sintered at a temperature lower than 650° C. would have extremely low coupling forces between fine particles so that a resulting bearing would be fragile in composition.

As described above, a solid lubricant comprising fine particles made of an inorganic compound such as molybdenum disulfide coated with copper is added to a main material to create a mixture which is then molded with pressure, and the resulting mold is sintered at a temperature in a range of 650° C. to 700° C. to allow for utilization of the lubrication performance provided by the sintered body 20b itself, thereby making it possible to prevent abrasion and seizure due to the boundary lubrication. In addition, since the sintering is performed at a relatively low temperature, expansion of the material can be suppressed, thus providing a high dimensional accuracy for the sintered body 20b.

While in this embodiment, the solid lubricant comprising fine particles made of an inorganic compound such as molybdenum disulfide coated with copper is mixed in the entire sintered body 20b, similar effects can be produced in an embodiment in which the solid lubricant comprising fine particles made of an inorganic compound such as molybdenum disulfide coated with copper is added only in the inner peripheral surface of the shaft hole 21 for supporting the shaft 31. Also, from a viewpoint of a material cost and lubrication performance, molybdenum disulfide is the most preferable as a solid lubricant.

Method of Manufacturing Sintered Oil-impregnated Bearing

The sintered oil-impregnated bearing constructed as described above may be manufactured in the following manner.

Figure 2:
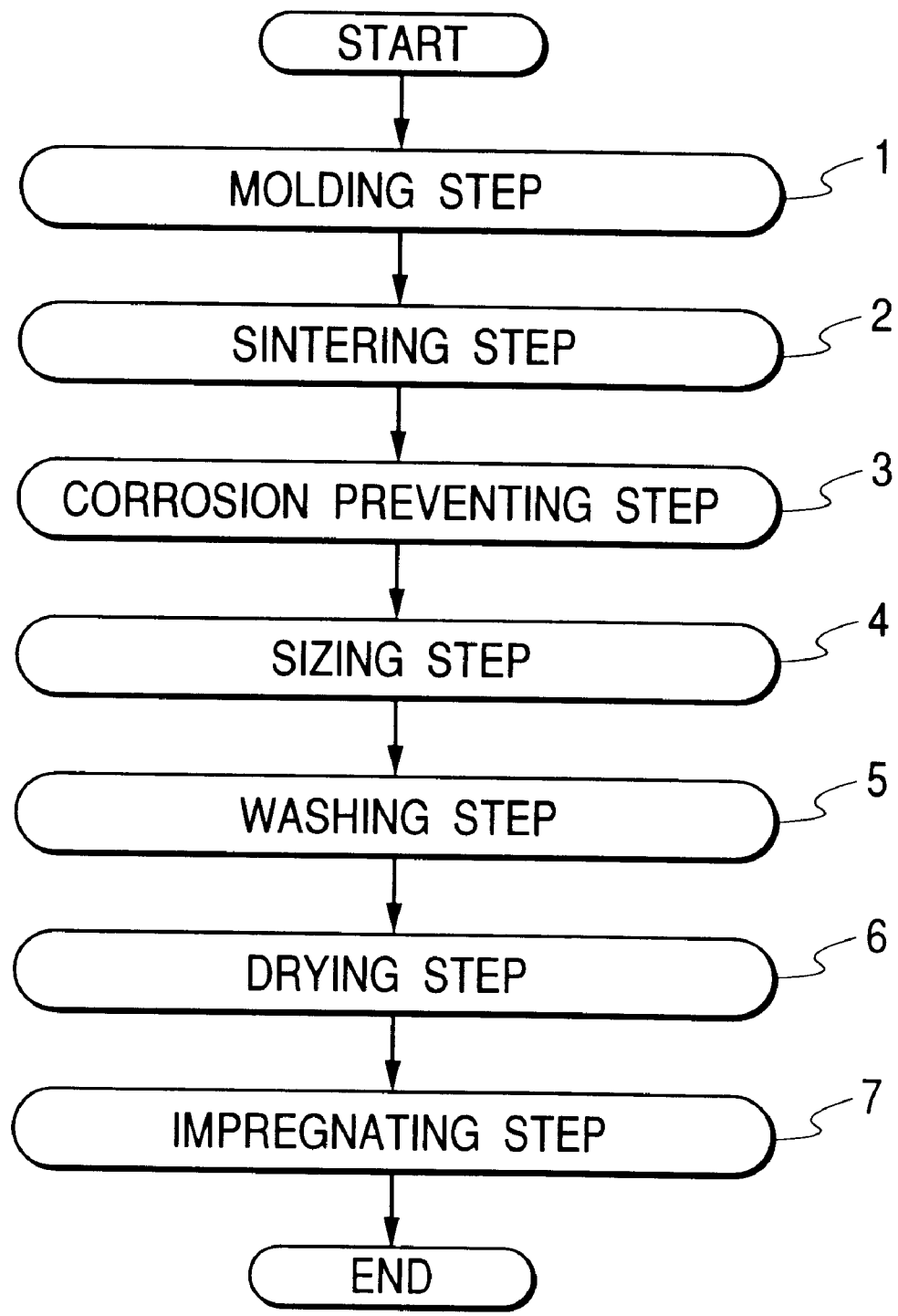
FIG. 2 is a flow diagram illustrating various steps in a process of manufacturing a sintered oil-impregnated bearing to which the present invention is applied.
Figure 3:
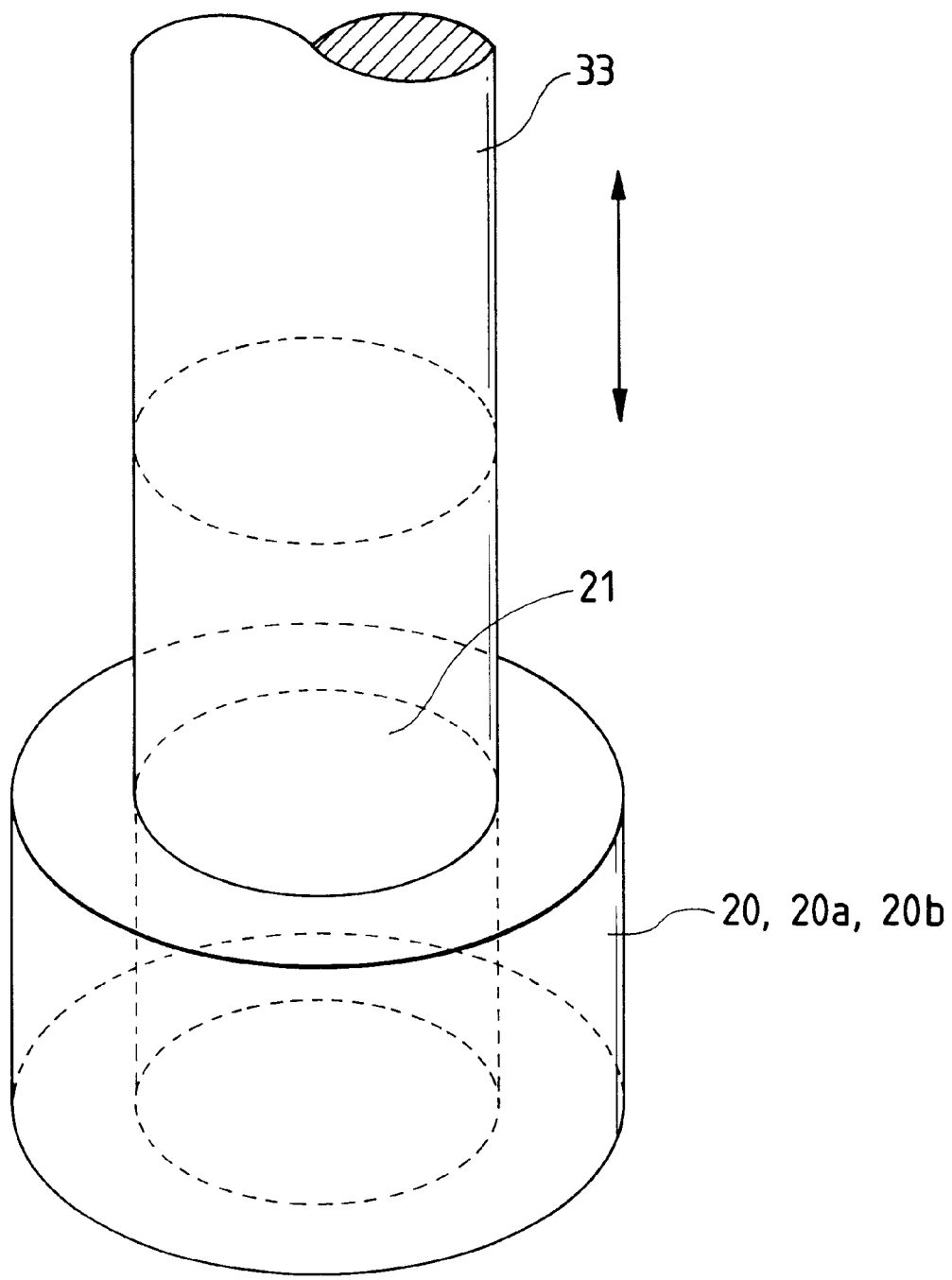
FIG. 3 is a diagram for explaining a sizing step executed in the process of manufacturing a sintered oil-impregnated bearing to which the present invention is applied.

FIG. 2 is a flow diagram illustrating a method of manufacturing a sintered oil-impregnated bearing according to this embodiment, and FIG. 3 is a diagram for explaining a sizing step which is executed when the sintered oil-impregnated bearing of this embodiment is manufactured.

As can be seen from FIG. 2, the method of manufacturing the sintered oil-impregnated bearing 20 of this embodiment performs a molding step 1, a sintering step 2, a corrosion preventing step 3, a sizing step 4, a washing step 5, a drying step 6 and an impregnating step 7 in this order. The order of the steps is similar to conventional manufacturing methods.

First, in the molding step 1, 98 weight parts of copper coated iron powders with a copper coating amount equal to 40 weight percent and a granularity distribution equal to 200 mesh or less, 2 weight parts of copper—molybdenum disulfide fine particles with a granularity distribution equal to 200 mesh or less (a solid lubricant comprising molybdenum disulfide fine particles coated with copper), and 0.3–0.5 weight parts of zinc stearate as a lubricant between a die and the fine particles during the molding are formulated, and stirred for mixing. Subsequently, the mixture is molded with a pressure ranging from one to three tons/cm$^2$ using a cavity of a predetermined shape to produce a pressed powder body 20a in a cylindrical shape having an outer diameter of 7.02 mm$\phi$, an inner diameter of 3.54 mm$\phi$ and a height of 4.00 mm, as illustrated in FIG. 3.

Next, in the sintering step 2, the pressed powder body 20a is preheated, and then sintered in an ammonia cracker gas (a nitrogen—hydrogen atmosphere) for 30 minutes at a temperature in a range of 650° C. to 700° C. to produce a sintered body 20b.

Next, in the corrosion preventing step 3, a corrosion preventing treatment is performed on the sintered body 20b, which has just gone through the sintering step 2, in order to prevent corrosion on the surface of the sintered body 20b until a final step of the manufacturing. This corrosion preventing treatment involves using hydrocarbon oil or the like as a corrosion preventing liquid, and collectively immersing a large number of sintered bodies 20b accommodated in a washing cage or the like in this corrosion preventing liquid (hydrocarbon oil).

Next, in the sizing step 4, the sintered body 20b, which has gone through the corrosion preventing step 3, is treated for the shape and surface condition. In this step, a sizing rod 33 having a diameter substantially equal to the inner diameter of a shaft hole 21 of the cylindrical sintered body 20b is passed therethrough, as illustrated in FIG. 3, to recompress small ruggedness such as pores, molding flash and so on interspersed on the inner surface of the sintered body 20b with the sizing rod 33.

As a result, the inner surface of the sintered body 20b is provided with an improved surface roughness and finer pores. In this sizing step 4, the sintered body 20b is generally applied with a sizing lubricant liquid for purposes of reducing a friction coefficient between the sintered body 20b and the sizing rod 33.

Alternatively, the corrosion preventing liquid (hydrocarbon oil) used in the corrosion preventing step 3 still remains on the surface of the sintered body 20b, so that this corrosion preventing liquid may be utilized as it is as the sizing lubricant liquid, instead of drying same.

Next, the washing step 5 is performed. Conventionally, the washing step 5 has been performed for purposes of removing the corrosion preventing liquid and the sizing lubricant liquid. However, if a hydrocarbon oil is used as a washing liquid, in the same manner as the corrosion preventing liquid (sizing lubricant liquid), it can be said that the washing step 5 is performed for purposes of removing metal powders remaining in pores of the sintered body 20b and metal particles or the like possibly produced during the sizing step, rather than removing the corrosion preventing liquid (sizing lubricant liquid).

Next, in the drying step 6, the sintered body 20b, which has gone through the washing step 5, is heated to evaporate the washing liquid (hydrocarbon oil) remaining on the sintered body 20b. This drying step 6 is performed at a temperature lower than 80° C. so as to prevent copper, a raw material of the sintered body 20b, from being oxidized. Since the hydrocarbon oil has good drying characteristics, it is perfectly evaporated from the surface of the sintered body 20b.

After the drying step 6, the impregnating step 7 is performed. In this impregnating step 7, the sintered body 20b, which has gone through the drying step 6, is impregnated with mineral oil (paraffin-based hydrocarbon oil, naphthene-based hydrocarbon oil or the like) as lubricant oil. The impregnating step 7 develops the sintered body 20b into a sintered oil-impregnated bearing 20. As an alternative to the mineral oil, synthetic oil (polyolefine-based hydrocarbon oil or the like) may be impregnated as lubricant oil.

Exemplary Use of Sintered Oil-impregnated Bearing in Motor

Figure 4A:
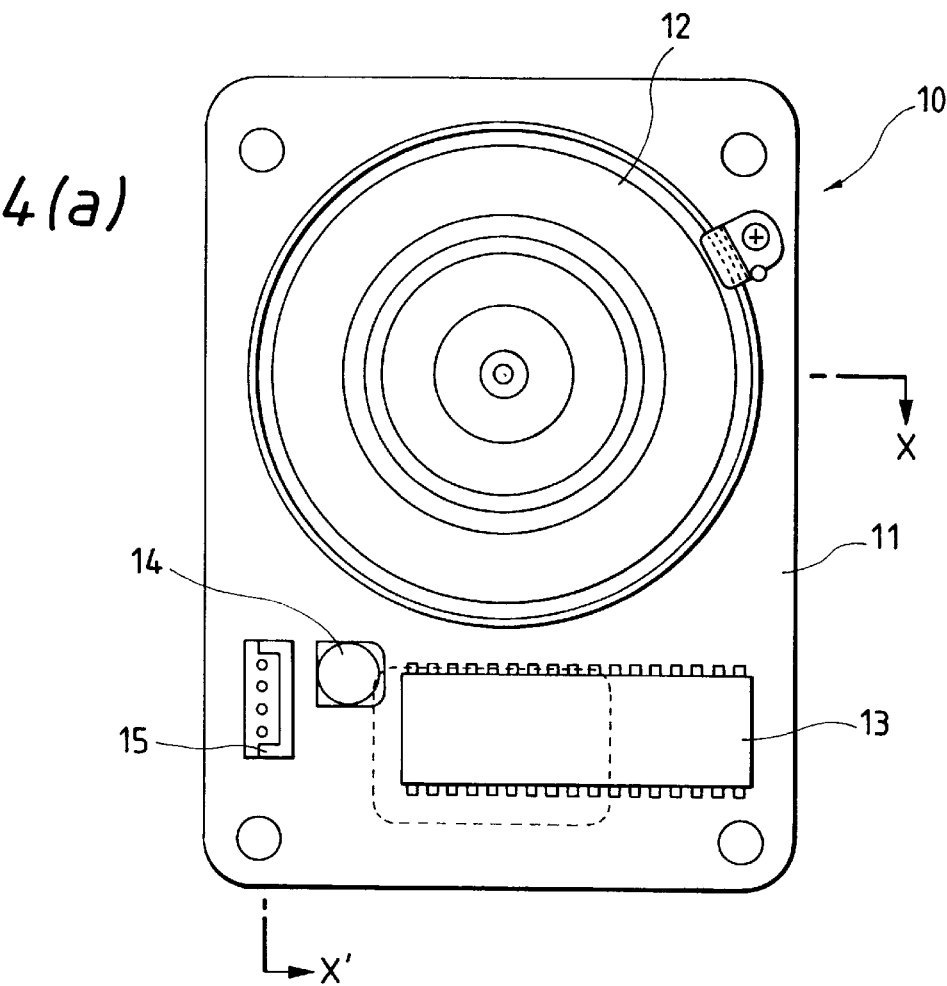
FIG. 4(a) is a plan view illustrating a motor unit comprising a bearing device.
Figure 4B:
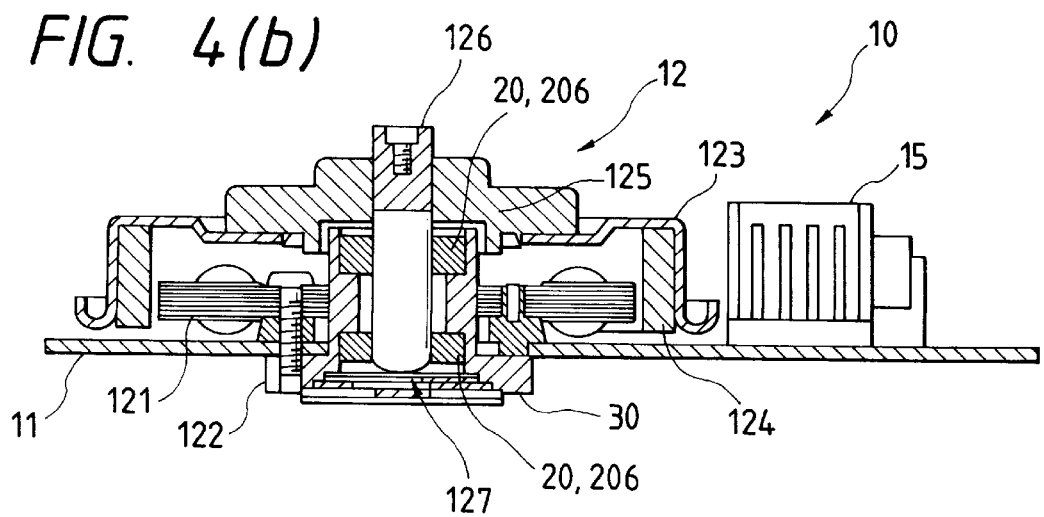
FIG. 4(b) is a cross-sectional view taken along a line X–X' in FIG. 4(a).

FIG. 4(a) is a plan view illustrating a motor unit using the sintered oil-impregnated bearing to which the present invention is applied, and FIG. 4(b) is a cross-sectional view taken along an X–X' line in FIG. 4(a).

As illustrated in FIGS. 4(a) and 4(b), the motor unit 10 has a circuit board 11 which also serves as a mounting plate. The circuit board 11 comprises a motor body 12; an IC 13 for driving and controlling the motor body 12; a magnetic sensor 14, as a component of a magnetic encoder for detecting the position of the motor body 12; and a connector 15 for connecting the circuit board 11 to an external wire. These components are mounted on the circuit board 11.

The motor body 12 comprises an outer rotor type motor which has a substantially cylindrical bearing device 30 mounted on the rear surface of the circuit board 11 and extending therethrough to the front surface. A stator 121 having a core wound with a coil is mounted such that the stator 121 concentrically surrounds the outer peripheral surface of the bearing device 30. The bearing device 30 and the stator 121 are securely fastened with a common bolt 122. A magnet 124 fixed on the inner surface of a cup-shaped rotor case 123 is disposed opposite to an outer end surface of the stator 121 with a slight gap defined therebetween. A boss 125 is mounted on a central portion of a top surface of the rotor case 123. The boss 125 couples a motor shaft 126 and the rotor case 123. A base end side of the motor shaft 126 is rotatably supported by the bearing device 30 having a built-in sintered oil-impregnated bearing 20, to which the present invention is applied. The base end of the motor shaft 126 is supported by a thrust bearing 127.

In the motor 10 constructed as mentioned above, since the sintered body 20b, constituting the sintered oil-impregnated bearing 20, itself has the lubricity, abrasion and/or seizure will never occur even in a boundary lubrication condition where the motor shaft 126 is in direct contact with the sintered body 20b of the sintered oil-impregnated bearing 20. Particularly, when the present invention is applied to a motor having a wide rotation range such as a spindle motor for driving CD-ROM, and a motor having a large side thrust such as a capstan motor for VTR, these motors will be free from abrasion and seizure in the boundary lubrication condition.

As described above, the sintered oil-impregnated bearing according to the present invention is provided in that a solid lubricant comprising fine particles made of molybdenum disulfide or the like having surfaces coated with copper is added to composite fine particles (main material) made of iron powders having surfaces coated with copper in the entirety of the cylindrical sintered body or in a bearing surface thereof, so that the sintered body itself has the lubricity. Therefore, abrasion and/or seizure will never occur even in the boundary lubrication condition where a shaft and the sintered body are in direct contact with each other. Also, since the solid lubricant used in the present invention has an improved sintering property by coating the fine particles made of an inorganic compound with copper, the sintering temperature may be reduced to 700° C. or lower. However, in favor of ensuring to provide an appropriately sintered body, the sintering temperature is set at 650° C. or higher. When the sintering temperature is set within such a range, the solid lubricant will not be decomposed during the sintering, so that the lubricant performance of the sintered body itself can be utilized, even with a sintered oil-impregnated bearing, thereby making it possible to prevent abrasion and/or seizure due to the boundary lubrication. Further, since a lower sintering temperature can be set, the dimensional accuracy for the sintered body is advantageously high.

APPENDED TABLE 1

| Condition | 1 | 2 | 3 | 4 | 5 |
|---|---|---|---|---|---|
| Solid Lubricant | Added | Added | Added | Added | not Added |
| Sintered Temperature (° C.) | 650–750 | 680–700 | 725–750 | 780–820 | 650–700 |
| Number of Samples with Increased Current | 1 (3%) | 3 (10%) | 6 (20%) | 10 (33%) | 15 (60%) |

APPENDED TABLE 1-continued

| Condition | 1 | 2 | 3 | 4 | 5 |
|---|---|---|---|---|---|
| Number of Seized Samples | 0 | 0 | 0 | 0 | 6 (20%) |

Number of Samples for Each Condition: 30

What is claimed is:

1. A method of manufacturing a sintered oil-impregnated bearing comprising:

providing a mixture by adding a solid lubricant to a main material, the main material including fine particles, the fine particles comprising iron powders having surfaces coated with copper, the solid lubricant comprising fine particles made of an inorganic compound selected from a group consisting of molybdenum disulfide, boron nitride, tungsten disulfide and graphite, the fine particles of the solid lubricant having surfaces coated with copper;

molding the mixture with pressure using a cavity of a predetermined shape to produce a pressed powder body;

sintering the pressed powder body to produce a sintered body; and impregnating the sintered body with lubricant oil, wherein said sintering of the pressed powder body is performed at a temperature less than 700° C. but not less than 650° C.

2. A method of manufacturing a sintered oil-impregnated bearing according to claim 1, wherein a proportion of an adding amount of the solid lubricant to the amount of the main material ranges from one weight percent to three weight percent.

3. A method of manufacturing a sintered oil-impregnated bearing according to claim 1, wherein the solid lubricant has a granularity distribution equal to or less than 200 mesh.

4. A method as recited in claim 1, wherein the inorganic compound is molybdenum disulfide or tungsten disulfide.

* * * * *